United States Patent [19]

Grable

[11] 4,024,913

[45] May 24, 1977

[54] WELL INSTALLATIONS EMPLOYING NON-METALLIC LINES, TUBING CASING AND MACHINERY

[76] Inventor: Donovan B. Grable, 2515 San Francisco Ave., Long Beach, Calif. 90806

[22] Filed: Mar. 29, 1976

[21] Appl. No.: 671,141

Related U.S. Application Data

[63] Continuation-in-part of Ser. No. 454,069, March 25, 1974, abandoned.

[52] U.S. Cl. .................................. 166/72; 166/68; 166/77; 166/177; 166/242; 57/149; 138/DIG. 7; 138/123; 138/132; 308/4 A; 403/215; 403/255; 403/275
[51] Int. Cl.² ............... E21B 17/00; E21B 17/02; F16L 11/02; F16G 11/05
[58] Field of Search ............ 57/149; 166/242, 77, 166/170, 68, 176, 177; 403/275, 255, 215; 138/DIG. 7, 118.1, 123, 129, 132; 52/727; 117/128; 308/4 A

[56] References Cited

UNITED STATES PATENTS

| | | | |
|---|---|---|---|
| 1,694,683 | 12/1928 | Cole | 403/275 X |
| 2,181,344 | 11/1939 | Rick | 57/149 |
| 3,055,424 | 9/1962 | Allen | 166/242 X |
| 3,085,305 | 4/1963 | Colombet et al. | 403/275 |
| 3,100,924 | 8/1963 | Trier et al. | 403/275 |
| 3,212,582 | 10/1965 | Brown | 166/242 |
| 3,234,723 | 2/1966 | Brown | 166/242 X |
| 3,486,557 | 12/1969 | Harrison | 52/727 X |
| 3,681,911 | 8/1972 | Humphries | 117/128 X |
| 3,716,894 | 2/1973 | Kingston et al. | 403/275 |
| 3,739,457 | 6/1973 | Davis | 403/275 X |

OTHER PUBLICATIONS

Moore, "PRD–49 A New Organic High Modulus Reinforcing Fiber"; E. I. Du Pont de Nemours & Co., Inc., Textile Fibers Dept., Wilmington, Del., Feb. 1972.
"New from Du Pont... PRD–49", (E. I. Du Pont de Nemours & Co., Inc., Textile Fibers Dept., Wilmington, Del.) pp. 1–4, Mar. 1972.

Primary Examiner—Stephen J. Novosad
Attorney, Agent, or Firm—William W. Haefliger

[57] ABSTRACT

A well installation, such as casing, tubing, a line movable in the well, and surface equipment, consists of high strength, light weight, non-metallic material.

15 Claims, 25 Drawing Figures

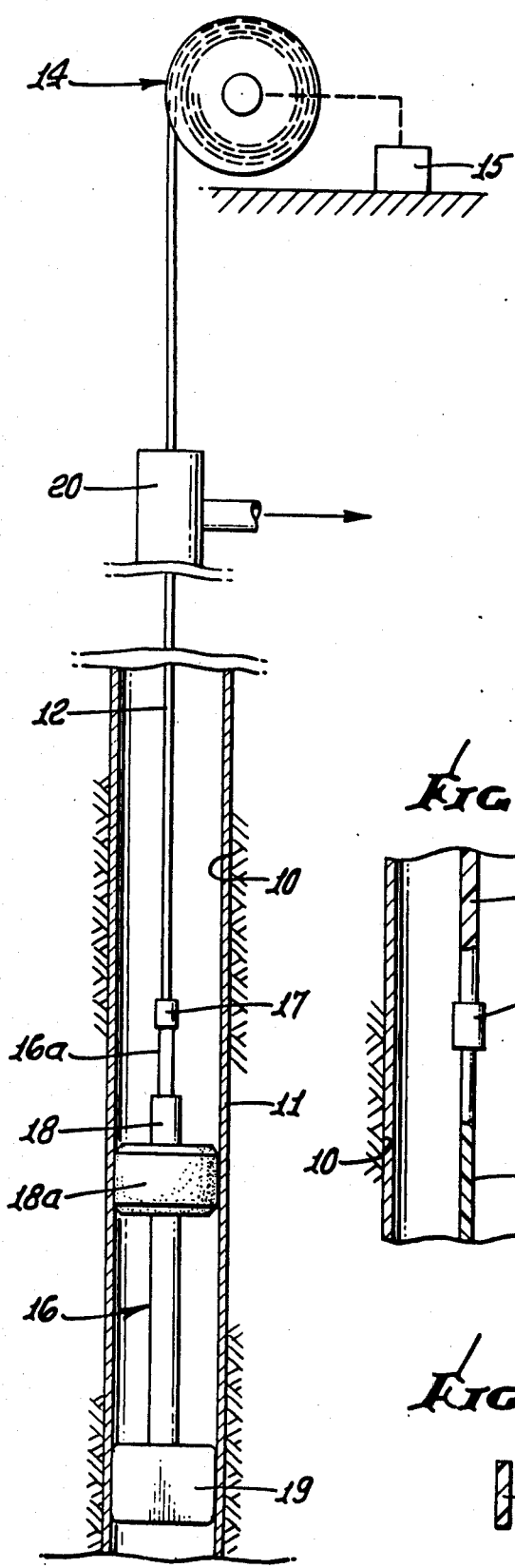
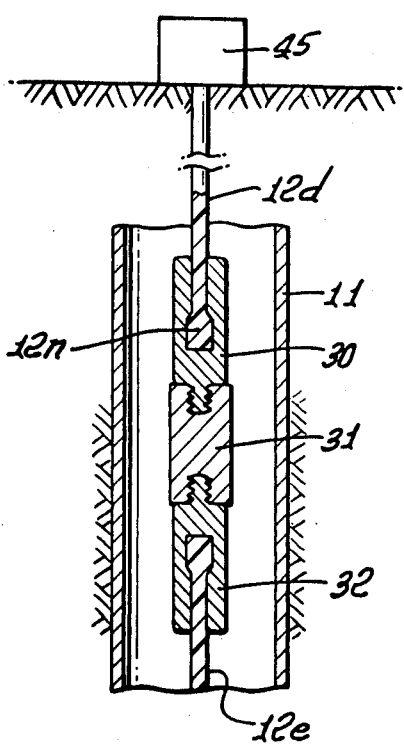
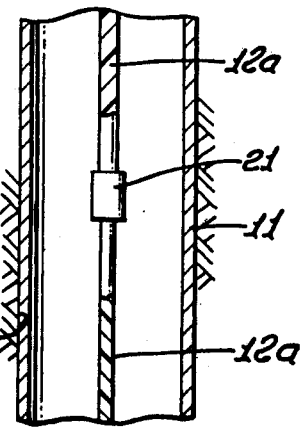
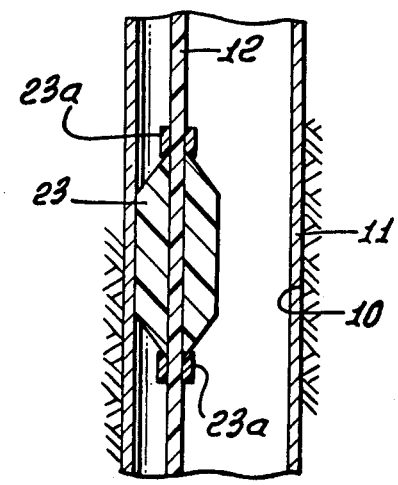
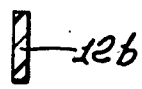

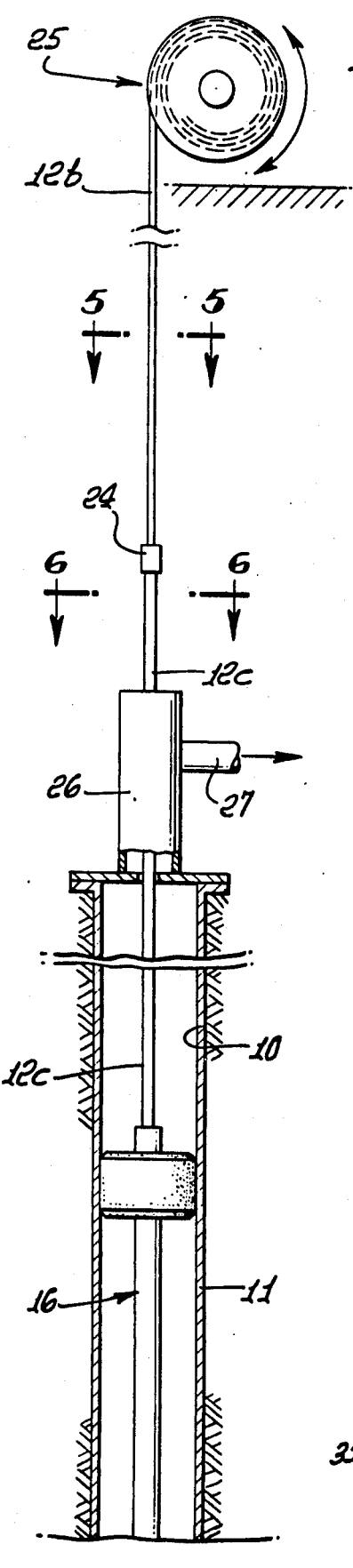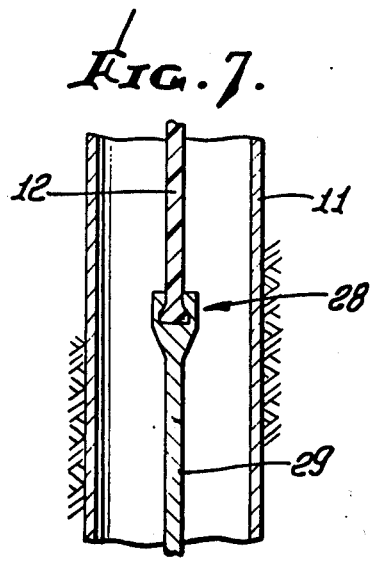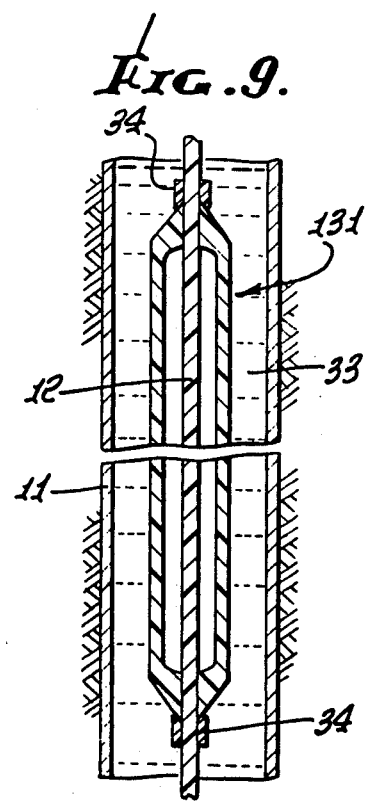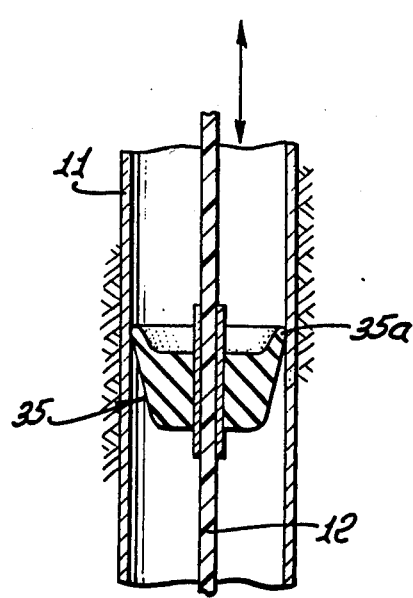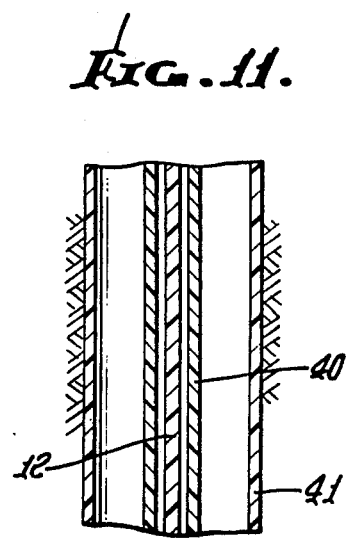

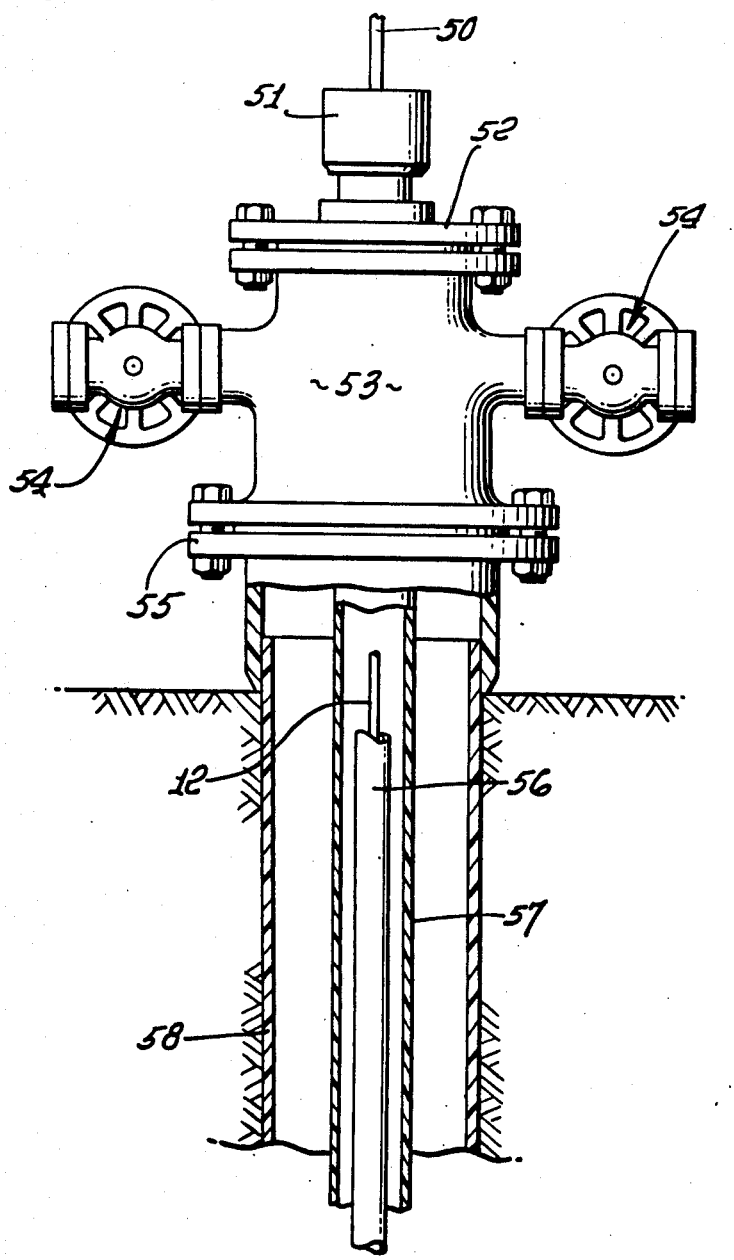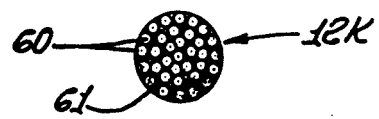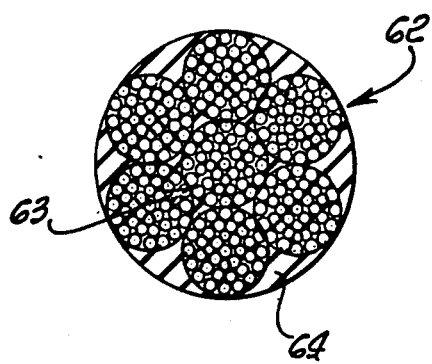

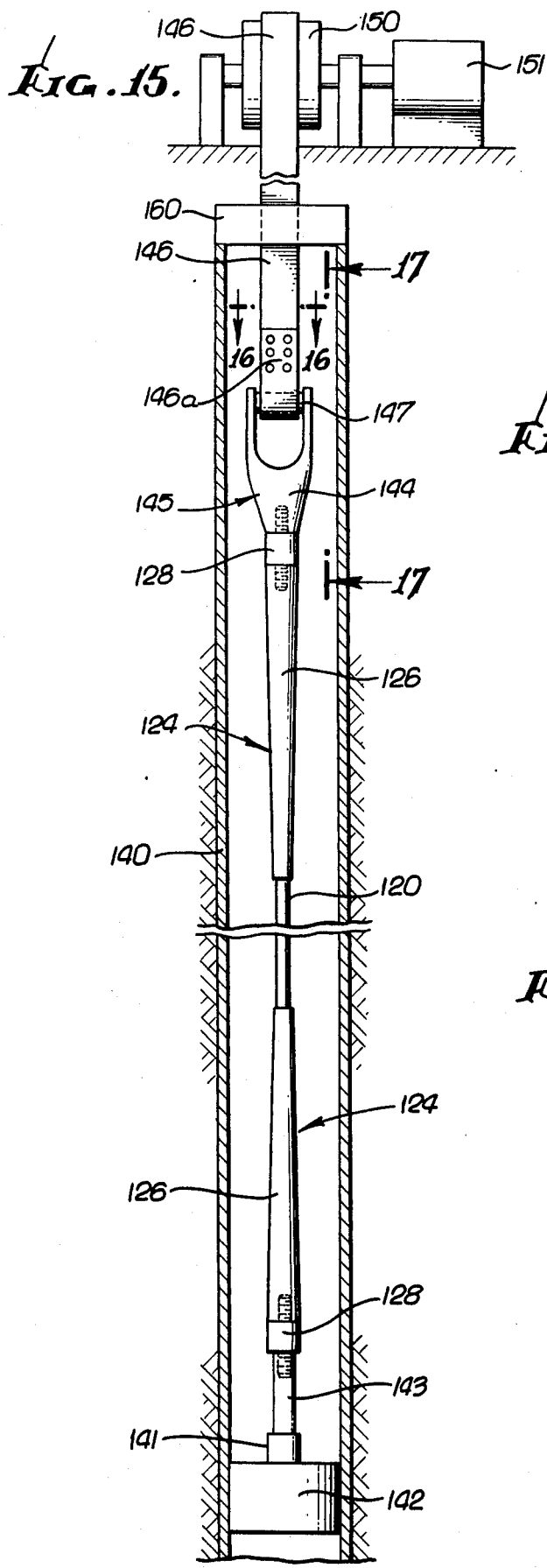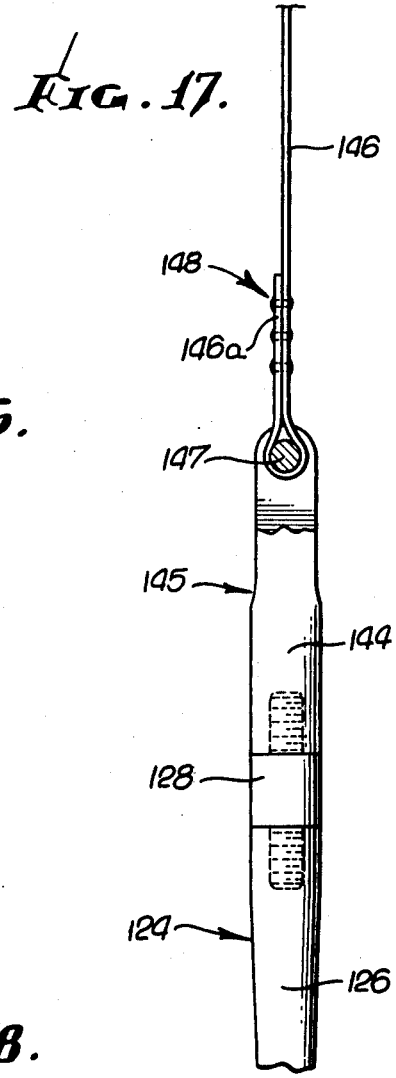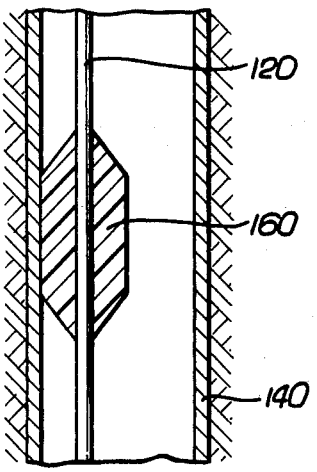

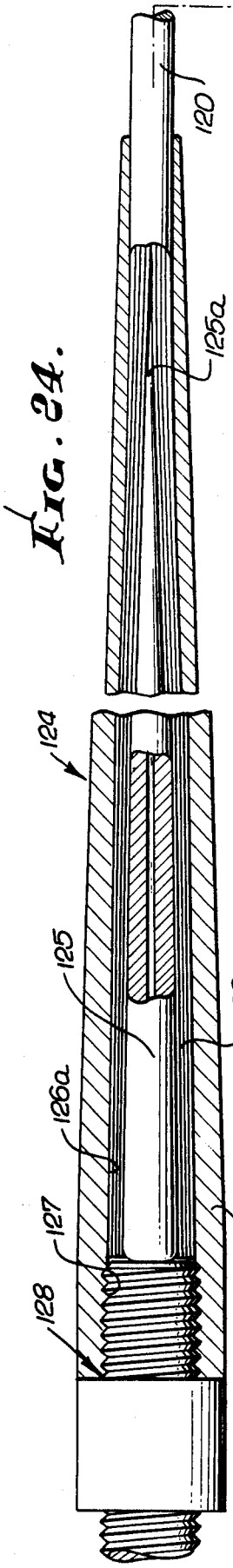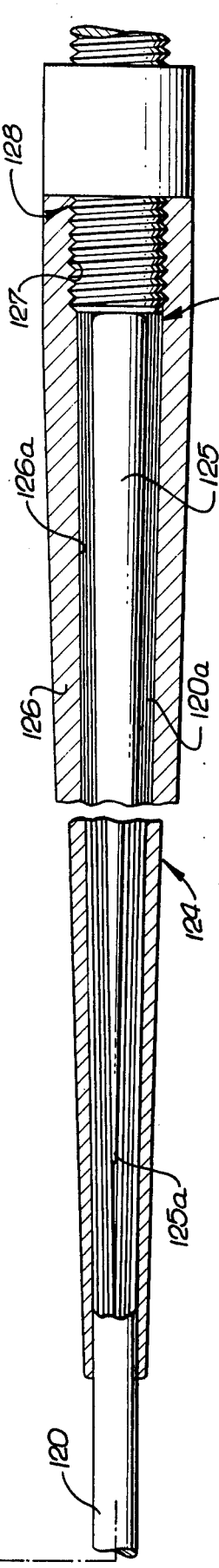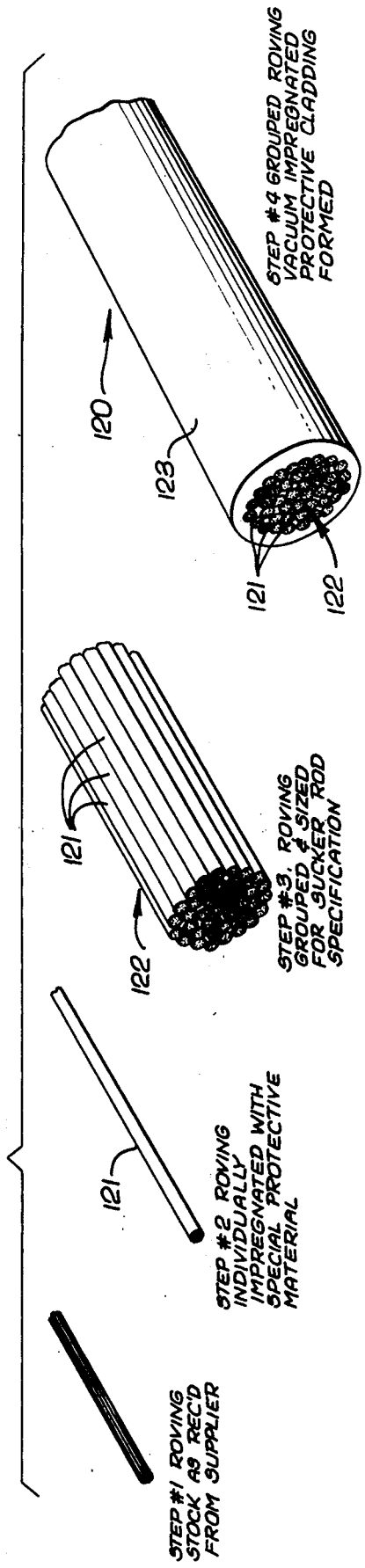

WELL INSTALLATIONS EMPLOYING NON-METALLIC LINES, TUBING CASING AND MACHINERY

This application is a continuation-in-part of my copending application Ser. No 454,069, filed Mar. 25, 1974, now abandoned.

BACKGROUND OF THE INVENTION

This invention relates generally to well installations, and more particularly concerns the use of well equipment constructed of non-metallic materials.

In the past, it has been thought necessary for many reasons including strength and durability to employ well sucker rod, casing the tubing consisting of steel, and the design of well installations has been predicated on the use of such material. However, employment of steel introduces many problems among which are the large loads that must be handled, included lifting and lowering of extremely heavy sucker rod lengths in deep wells (over 10,000 feet) which limites well depth and necessitates use of very large and heavy surface lifting equipment; the problems of rust and corrosion which is extremely critical in offshore installation; and the problems of magnetism induced in installed tubing, casing and sucket rods, which leads to lateral attraction of these elements resulting in excess friction and wear. For example, 15,000 feet of steel sucker rod will commonly impose a load of over 40,000 pounds on the surface liftng equipment, whereas the corresponding fluid column weight will be around 8,000 pounds. If the sucker rod weight could be substantially reduced, the capacity size and cost of the lifting equipment could be markedly lowered.

SUMMARY OF THE INVENTION

It is a major object of the invention to overcome the above and other problems resulting from use of metallic well tubing, sucker rod and casing, as well as other well equipment. Wit respect to elimination of steel sucker rod, the invention basically contemplates the use in a well of a line sized to support well equipment, the line consisting of multiple non-metallic fibers having a tensile strength greater than 185,000 psi and a specific gravity of less than 2.0. Typically, such a line will have a smaller cross-sectional width than that of steel sucker rod, to stroke a pump at a given depth, and therefore will be capable of being spooled at the surface allowing unlimited stroke length capability, when the line is of flexible construction. The latter factor enables use of such a line irrespective of its elongation or stretch, under reciprocating loads imposed by pumping, whereas a walking beam type surface pumping unit (rather than a spool) would be impractical due to limited stroke capability. Also, the need for tubing in the well is eliminated. As will be seen, circular and flat sections of the line may be connected by an internal plug and external sleeve attached to the end portion of the circular cross section, and a yoke connected to the flat cross section, the sleeve and yoke being interconnected.

Additional objects of the invention include the use on such a line of wear parts or enlargements to engage the casing bore so as to minimize wear of the line itself; the provision of a float or floats on the line to buoy the line as desired in well fluid; the connection of the line to steel sucker rods; the employed of multiple line sections connected in end to end relation; and the use of a spoolable line section having a generally flat cross section, that section being connectible to another line section of circular cross section in the well.

Other objects include the employment of casing and tubing made of the same material as the above described line; and other well equipment, particularly at the surface, made of that material to save weight and cost, without sacrificing strength.

These and other objects and advantages of the invention, as well as the details of illustrative embodiments, will be more fully understood from the following description and drawings, in which:

DRAWING DESCRIPTION

FIGS. 1-4 are elevations, in sections, showing various applications of the invention;
FIG. 5 is an enlarged section on lines 5—5 of FIG. 4;
FIG. 6 is an enlarged section on lines 6—6 of FIG. 4;
FIGS. 7-12 are elevations, in sections, showing further applications of the invention;
FIGS. 13 and 14 are cross sections;
FIG. 15 is a vertical section like FIG. 1;
FIG. 16 is a horizontal section on lines 16—16 of FIG. 15;
FIG. 17 is a vertical elevation on lines 17—17 of FIG. 15;
FIG. 18 is a view like FIG. 3;
FIG. 19 is a view like FIG. 9;
FIG. 20 is a view like FIG. 7;
FIG. 21 is a view like FIG. 11;
FIG. 22 is a view like FIG. 10;
FIG. 23 shows interconnecting of lines of different diameters
FIG. 24 is an enlarged elevation showing attachment of plugs and sleeves to line end portion; and
FIG. 25 shows the steps in the fabrication of a line as disclosed.

DETAILED DESCRIPTION

Figure 19:
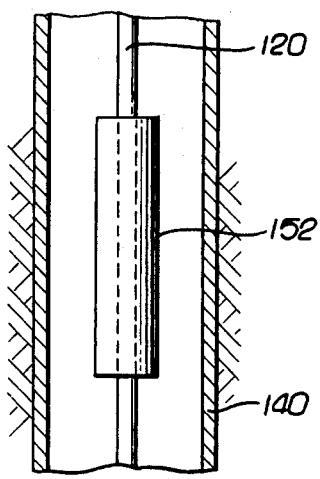

In FIG. 1, a well 10 is cased at 11, and a line 12 shown extending from the well head downwardly to equipment in the well. The line is sized to support the equipment, and normally will have a cross-sectional area substantially less than that required for steel sucker rod, to support the same weight in the well. As an example, where round sucker rod might have a diameter between ¾ and 1⅛ inch, the present line, when round, will have a diameter between about 0.53 and 0.90 inch.

The line consists of multiple non-metallic fibers or strands, which may have braided or other woven textile configurations, the strands having a tensile strength substantially in excess of 185,000 psi, and a specific gravity less than 2.0. One synthetic polymer meeting these requirements is that known by the trademark EXTEN, a product of The Goodyear Corporation, Akron, Ohio. That material has the following properties:

Ultimate tensile strength — 370,000 psi
Specific gravity — 1.44
Tenacity — 20.0 gpd
Modulus — 340 gpd
(E) — 6, 4×10$^6$
Ultimate elongation (%) — 5
Zero strength temperature — 850° F
50% R. T. strength — 600° F
Filaments per yarn — 2300

Fillament diameter — 0.0003 inches.

Another similar synthetic polymer is produced by E. I. duPont de Nemours and Co., Wilmington, Delaware, and is known by the trade name "KEVLAR 49".

The line 12 is typically flexible, and surface means is provided to spool the line at the well head; for example, a spool or drum 14 may be suitably motor driven as at 15 to raise and lower the line to operate a sub-surface pump indicated generally at 16. The latter may comprise what is known as a "casing" pump having a plunger 16a (to which the line 12 is connected at 17) and a pump barrel 18. Such pumps are manufactured, for example, by Lamtex Equipment Corporation, Fort Worth, Texas. A suitable seal 18a packs off between the barrel and casing, and a hold-down or shoe 19 retains the barrel in position at selected depth. The casing 11 in FIG. 1 may alternatively be considered to represent well tubing, and the shoe 19 may be permanently or removably connected to such tubing. Also a suitable stuffing box 20 may be employed at the surface.

The use of the FIG. 1 line 12 has important advantages over a conventional steel rod string, including the fact that many thousands of pounds of dead weight of a steel rod string (in excess of the weight of line 12) is eliminated, enabling use of much smaller and lower powered surface lifting equipment; the lower specific gravity of line 12 makes it almost floatable in well fluid being lifted in the well; the fact that line 12 is spooled at 14 accommodates any enhanced stroke length requirements imposed by stretch of the line; and the very high tensile strength of the line (i.e. substantially greater than that of steel) enables use of smaller line diameters than conventional sucker rod diameters, which in turn facilitates spooling. In addition, higher strength than steel enables use of line 12 in much deeper wells than can be produced using steel sucker rods. A safety joint may be connected in line 12, as at 17 for example, so that if the pump 16 should become stuck or sand up, the string will part at that joint under sufficient pull. It should also be noted that line 12 may be used to pull the bottom-hole pump from the well and also to run it back into the well; similarly, line 12 may be used to run other equipment in the well, such as bailing apparatus, sand lines, logging, and well survey apparatus, and fishing and workover tools.

Turning to FIG. 2, the line 12 may be made up of sections, as at 12a, of selected length, and which may be connected in end-to-end relation as at 21. In this regard, successive sections may have different diameters, as for example decreasing diameters in a down-hole direction, providing a "tapered" string, with each section being several hundred or thousand feet in length. This reduces even further the line weight to be lifted and lowered. A sinker bar may be connected with the line to assure its descent in the well.

FIG. 3 shows the provision of a radially enlarged wear part 23 attached to line 12, as by means of clamps 23a to retain wear part split sections on the line. Part 23 may have the same composition as line 12, with the fiber or strands impregnated with a suitable resin such as epoxide to form a rigid shape. The wear part may engage the bore of casing, thereby spacing the line 12 from rubbing engagement with the casing. Also, part 23 wears, rather than the casing, as that part moves up and down with the line. Parts 23 may be employed at between 50 and 200 foot intervals along the line, for example, and they may also be integrally formed on the line.

FIG. 4 shows a modified line including sections 12b and 12c which are connected in series at 24. Section 12b has flat band or rectangular cross section, as appears in FIG. 5, enabling ready spooling at 25; whereas section 12c is of round or circular cross section, as appears at FIG. 6, to be packed-off in a conventional stuffing box 26. Production fluid flows to side conduit 27.

FIG. 7 shows the end interconnection at 28 of non-metallic line 12 with a steel sucker rod string 29, as may be desired in certain applications. In FIG. 8 the line is formed in rod-like sections 12d and 12e which are relatively inflexible. For example, a suitable resin such as epoxide may be used to impregnate the line fibers, and the sections may have 30, 60 or 90 foot length, with threaded parts 30, 31 and 32 interconnecting the ends of the sections to form a string of much lighter weight, and with much smaller cross section (for the same load capacity) then conventional steel sucker rod. The line ends 12n may be swage connected to parts 30 and 32 as shown.

FIG. 9 shows a line 12 having a float or floats 131 connected thereon at intervals, for exerting buoyant force on the line when submerged in well fluid 33. In this way, the assembly of line 12 and floats may be made nearly buoyant, so that substantially only the weight of the well fluid being lifted is exerted on the surface lifting equipment. Float 131 may consist of the same material as line 12, and may be attached thereto as by clamping at end locations 34. FIG. 10 shows attachment of a swab cup 35 to vertically reciprocated line 12, for lifting fluid in a well, the cup lip 35a engaging the casing.

Turning to FIG. 11, the line 12 is shown in a well, and received in tubing 40 which is in turn received in well casing 41. Either or both of the tubing and casing may advantageously consist of the same strong, low density material as the line 12, and as described above. Such construction also eliminates magnetism problems as are encountered in wells containing steel tubing, casing and sucker rod, the latter being magnetically attracted together which increases friction and wear when displaced relatively vertically. The tubing and casing may be made in 30, 60 and/or 90 foot lengths. Accordingly, installation at well depths far in excess of those possible using steel tubing and casing, is enabled.

FIG. 8 also shows well head equipment 45, such as a platform, etc., for operating the well. Such equipment or parts thereof may consist of the same strong material as line 12, eliminating problems such as rust, corrosion (especially in off-shore application), etc.

The surface equipment 45 may also represent a walking beam made of the lightweight material referred to. It may be operated to reciprocate line 12, which may be used to drill a well (with a bit connected to the line via a stem, jars and a socket); deepen a well and do remedial work; clear out of a well, and bailing; as well as pump a well as described herein. All of these functions may be carried out at extremely deep levels, well in excess of 10,000 feet, which would not be possible with steel sucker rod due to its high weight. The surface equipement may be formed by impregnating the fibers with resin such as Nylon, and molding same to part shape.

FIG. 12 shows well surface equipment all of which may consist of the high strength material (as for example EXTEN) used for the line 12. The illustrated equipment includes polish rod 50, stuffing box 51, flange 52, well head 53, valve body 54, base plate 55, production tubing 56, casing 57, surface pipe 58, and line 12 as previously referred to.

FIG. 13 is a cross section through a typical flexible cable or line 12k, showing multiple high strength fibers 60, as described. The flexible line may also include an elastomer 61 impregnating the cross section, binding the fibers in substantially side-by-side relation, and forming a unitary line capable of spooling. FIG. 14 is a cross section through another type line showing bundles 62 of fibers of spiral configuration about a central bundle 63. That figure also shows the use of an impregnating material 64 which may consist of elastomer (such as neoprene or rubber, for example), or an epoxide resin or other resin such as Nylon to form a rigid line which may have circular outer shape. Such an elastomer may be used in the flat band section shown in FIG. 5.

Referring now to FIG. 24, the illustrated line 120, which correponds to line 12, may be fabricated as shown in the four steps of FIG. 25. The completed line comprises parallel fibrous rovings 121 which are impregnated with and bonded together by a high strength adhesive such as epoxy or the E. I. duPont de Nemours synthetic polymer product known as NYLON "ZYTEL ST". A cladding or sheath 123 applied to surround the cluster 122 may consist of the same material. The resulting line has circular or near-circular cross-section.

The line 120, of selected length, is then attached to steel end connections indicated at 124 in FIG. 24. Each connection comprises an axially tapered and elongated metallic plug 125 tapering to a point near locus 125a. The plug centrally and axially penetrates the line end portion to spread the end rovings into a frusto-conical configuration indicated at 120a as adjacent the plug surface along the major length of the elongated plug. A metallic sleeve 126 receives the line end portion 120a and the plug, the rovings being retained or jammed between the plug and the sleeve bore 126a. In this regard, the plug outer conical surface adjacent which the rovings extend is at least ten times as long, axially, as the maximum diameter of that surface, so as to prevent shear of the roving fibers at the transition point adjacent the pointed end of the plug (the shear strength of the fibers is much lower than their tensile strength). The fibers consist of the same material as previously referred to, as for example KEVLAR. Typically, the length of the sleeve may be between about 60 and 120 inches for a line diameter of about 1 inch. The taper angularity of the plug and the sleeve bore (from the axis) is less than 1°, and typically no greater than about 30 minutes to overcome the shear problem.

The interconnection of the spread rovings to the plug and sleeve may be effected by bonding, using a vacuum injected adhesive, such as "ZYTEL ST" referred to above. For this purpose, the plug may be tubular to flow adhesive therethrough to locus 125a. Accordingly, the plug and sleeve are effectively interconnected and also prevent loosening or separation of the line end portion 120a under loads to be encountered in a well. Finally, the sleeve provides an interiorly threaded box end connection at 127 to receive a crossover pin as at 128 or similar connecting pin.

Referring to FIG. 15, the line 120 is installed in a well, cased at 140, to be vertically reciprocated for stroking the piston 141 of a down-hole suspended pump 142. The piston rod 143 is attached to a lower end connection 124 as described, from which line 120 extends upwardly to a location near the surface. An upper end-connection 124 connects the line to the lower stem 144 of a yoke 145 to which another or second line 146 is attached. Line 146 is of rectangular cross section, as seen in FIG. 16, to have flat belt shape, and it is connected to the yoke as by wrapping around a transverse pin element 147 of the yoke, the free end 146a then doubled back and flatly attached to the main extent of the second line, as at 148 in FIG. 17. Line 146 may also consist of KEVLAR or like propertied material.

A surface means such as drum 150 readily spools the flat line 146, and a prime mover 151 rotates the drum back and forth to raise and lower the lines 146 and 120, operating well pump 142. Flat line 146 passes through a stuffing box 160 at the well head, the box being of the type described in Grable et al U.S. Patent application Serial No. 64,554, filed Aug. 14, 1975.

Figure 21:
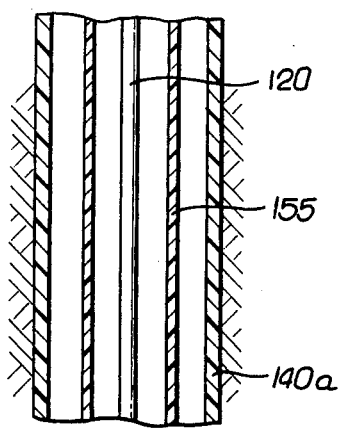
Figure 20:
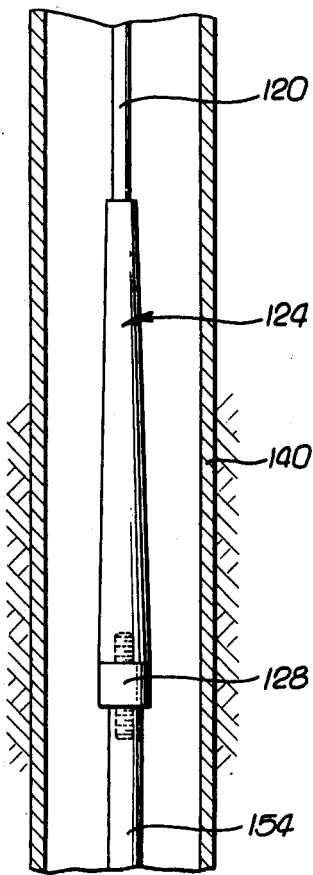

FIG. 18 shows a wear part 160 on line 120, similar to the arrangement in FIG. 3, the wear part rubbing against casing 140. FIG. 19 illustrates a float 152 connected with line 120 in the well, in a manner similar to that described in FIG. 9. The float tends to buoy the line in well fluid. FIG. 20 illustrates a steel sucker rod 154 connected with line 120, via end connection 124, rod 154 tending to weight the line downwardly in the well. FIG. 21 shows well tubing 155 receiving the line 120, and casing 140a receiving the tubing. Either or both of the tubing and casing may consist of KEVLAR or EXTEN, or similar propertied material, as referred to above.

Figure 22:
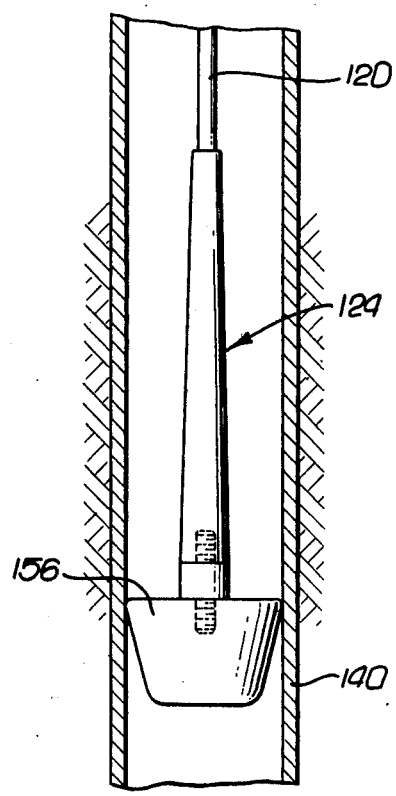
Figure 23:
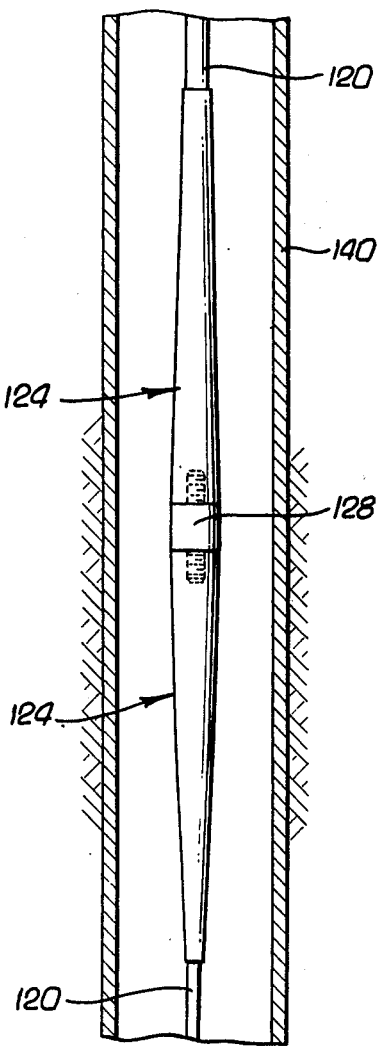

FIG. 22 shows a well pump swab cup 156 attached to the line 120 via end connection 124, to engage casing 140. FIG. 23 shows a tapered string including lines 120 of successively reducing diameters. These lines are connected by end connection 124.

I claim:
1. In a well installation, the combination comprising
  a. an axially elongated first line sized to extend downwardly in the well and support well equipment therein, the line have an end portion,
  b. said line consisting of multiple parallel non-metallic fibers having a tensile strength greater than 185,000 psi and having a specific gravity less than 2.0,
  c. an externally axially tapered and elongated metallic plug centrally penetrating said end portion, and a metallic sleeve receiving said line end portion and said plug, said sleeve having an axially tapered bore and said fibers retained between said plug and said bore, said sleeve connected to said plug, and
  d. a well pump connected to said sleeve to be suspended within well casing.

2. The combination of claim 1 wherein said fibers form multiple rovings which are bonded together to form a generally circular unitary line, and including non-metallic cladding on the line exterior.

3. The combination of claim 2 including a bonding agent interconnecting said rovings to said sleeve and said plug.

4. The combination of claim 1 installed in a well to be reciprocated vertically therein, and including well tubing receiving the line, said tubing consisting of multiple non-metallic fibers having a tensile strength in excess of 185,000 psi and a specific gravity less than 2.0.

5. The combination of claim 1 wherein the line includes a succession of end-to-end interconnected sections, said sections having generally circular cross sections, successive sections along the line having decreasing diameters.

6. The combination of claim 1 wherein the taper angularity of the plug is no greater than about 30 minutes.

7. In a well installation, the combination comprising
   a. an axially elongated first line sized to extend downwardly in the well and support well equipment therein, the line having an end portion,
   b. said line consisting of multiple parallel non-metallic fibers having a tensile strength greater than 185,000 psi and having a specific gravity less than 2.0,
   c. an externally axially tapered and elongated metallic plug centrally penetrating said end portion, and a metallic sleeve receiving said line end portion and said plug, said sleeve having an axially tapered bore and said fibers retained between said plug and said bore, said sleeve connected to said plug, and
   d. another line which is flexible and including surface means spooling said other line at the well head, said other line having a rectangular cross section, and there being a yoke having a transverse part about which said other line is connected, the yoke also connected to said sleeve in the well to support said first line therein.

8. The combination of claim 7 including a well fluid pump in the well and having a vertically reciprocable element, there being a second metallic sleeve connected with the line and said element for operating the pump in response to up and down movement of said line effected by said surface means.

9. The combination of claim 1 including a wear part of the line having a transverse cross-section greater than that of the line.

10. The combination of claim 9 including casing receiving said line and having frictional contact with said wear part.

11. The combination of claim 7 including a float thereon adapted to exert buoyant force on the line when submersed in well fluid in the well.

12. The combination of claim 7 including a steel sucker rod connected in endwise relation with said sleeve.

13. The combination of claim 7 and including well casing installed in the well and receiving said line, said casing consisting of multiple non-metallic fibers having a tensile strength in excess of 185,000 psi and a specific gravity less than 2.0.

14. In a well installation, the combination comprising
   a. an axially elongated first line sized to extend downwardly in the well and support well equipment therein, the line having an end portion,
   b. said line consisting of multiple parallel non-metallic fibers having a tensile strength greater than 185,000 psi and having a specific gravity less than 2.0,
   c. an externally axially tapered and elongated metallic plug centrally penetrating said end portion, and a metallic sleeve receiving said line end portion and said plug, said sleeve having an axially tapered bore and said fibers retained between said plug and said bore, said sleeve connected to said plug,
   d. well tubing receiving the line, said tubing consisting of multiple non-metalic fibers having a tensile strength in excess of 185,000 psi and a specific gravity less than 2.0, and
   e. well casing installed in the well and receiving said line and tubing, the casing consisting of multiple non-metallic fibers having a tensile strength in excess of 185,000 psi and a specific gravity less than 2.0.

15. In a well installation, the combination comprising
   a. an axially elongated first line sized to extend downwardly in the well and support well equipment therein, the line having an end portion,
   b. said line consisting of multiple parallel non-metallic fibers having a tensile strength greater than 185,000 psi and having a specific gravity less than 2.0,
   c. an externally axially tapered and elongated metallic plug centrally penetrating said end portion, and a metallic sleeve receiving said line end portion and said plug, said sleeve having an axially tapered bore and said fibers retained between said plug and said bore, said sleeve connected to said plug, and
   d. a well swab cup attached to said sleeve to engage well casing.

* * * * *